Feb. 10, 1953     M. W. WEBER     2,628,062
PUSH-BUTTON SPIGOT
Filed March 13, 1947
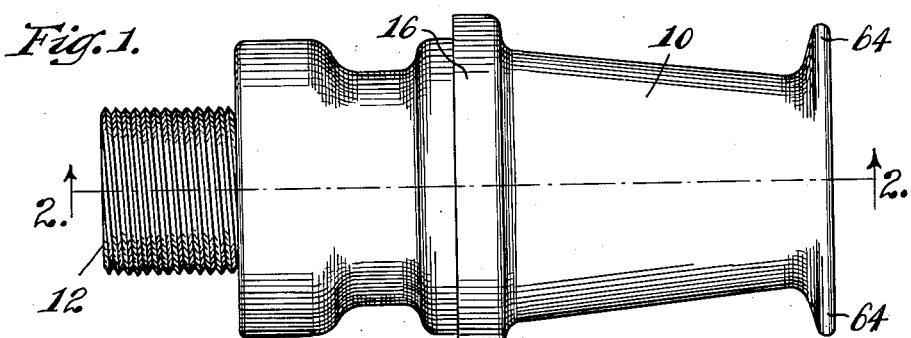
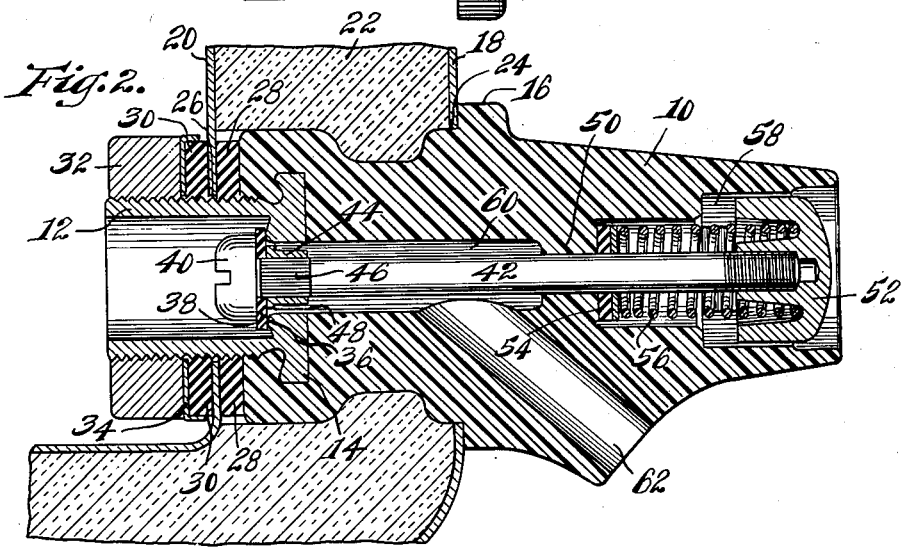
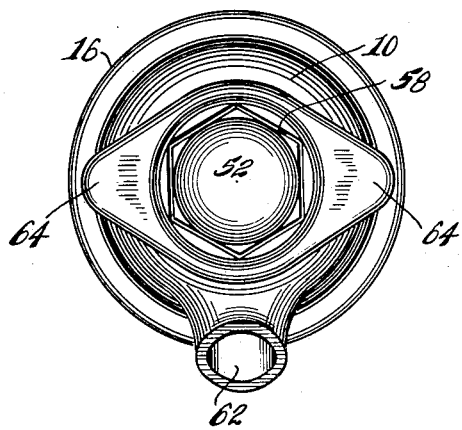
Inventor:
Milton W. Weber.
By Bair & Freeman
Atty's.

Patented Feb. 10, 1953

2,628,062

UNITED STATES PATENT OFFICE 2,628,062

PUSH-BUTTON SPIGOT

Milton W. Weber, St. Louis, Mo., assignor to Knapp-Monarch Company, St. Louis, Mo., a corporation of Delaware Application March 13, 1947, Serial No. 734,345

2 Claims. (Cl. 251—137)

My present invention relates to a spigot of "push-button" type, particularly adapted for mounting in the wall of an insulated jug or the like.

One object of the invention is to provide a spigot which is compact and presents a minimum of projection from the jug, the operating member of the spigot being countersunk in such manner with respect to the surface of the spigot body that all danger of accidental opening of the spigot by contact of extraneous objects with the operating member is eliminated.

Another object is to provide a spigot, which may be formed of die cast metal, or of plastic material such as Bakelite, Saran, or Cerex, whereby heat transmission through the body of the spigot is minimized, thereby increasing the overall efficiency of the insulation of the jug.

Still another object is to provide a spigot which is easily assembled in the wall of the jug and is so constructed that the valve elements of the spigot are readily assembled in the body of the spigot thereafter and/or disassembled for repair or replacement of parts.

A further object is to provide a spigot which has a spout that projects but slightly from the body of the spigot, thereby minimizing the possibility of breaking off the spout by accidential contact with objects while the jug is being carried or transported in a vehicle or the like.

Still a further object is to provide a spigot having a plastic body provided with a threaded insert, with which a nut coacts for mounting the spigot in the wall of a jug or the like, particularly one of the double-walled variety, between the walls of which heat insulating material is packed to provide an insulated jug structure.

With these and other objects in view, my invention consists in the construction, arrangement and combination of the various parts of my device whereby the objects contemplated are attained, as hereinafter more fully set forth, pointed out in the claims, and illustrated in the accompanying drawings, wherein:

Figure 1 is a plan view on an enlarged scale showing a spigot embodying my invention, the spigot being shown approximately double size.

Figure 2 is a sectional view on the line 2—2 of Figure 1, showing the spigot mounted in the wall of an insulated jug, and Figure 3 is a front elevation of the spigot, the front end being the right-hand end in Figure 2.

On the accompanying drawings I have used the reference numeral 10 to indicate a spigot body, which is preferably formed of plastic material. The body 10 has a threaded sleeve-like extension 12, which may be made in the form of a metallic insert molded in the body 10 during the molding process. The sleeve 12 preferably has an enlarged portion, such as a flange 14, for the purpose of preventing subsequent pull-out of the sleeve relative to the body 10. Instead of the body being formed of plastic material, it may be formed of die-cast metal, in which case the sleeve 12 may be formed as an integral part thereof.

The body 10 has a flange 16 adapted to contact the outer wall 18 of an insulated jug or the like, the jug shown being provided with an inner wall 20 and heat-insulating material 22 packed between the two walls. The spigot body is placed in position before the insulation is packed in, with a portion of the body adjacent the flange 16 extended through an opening 24 in the wall 18, and the sleeve 12 extended through a somewhat smaller opening 26 in the wall 20. A gasket 28 is interposed between the inner end of the body 10 and the wall 20, and a gasket 30 is interposed between the outer surface of the wall 20 and a nut 32. A sheet-metal washer 34 is interposed between the gasket 30 and the nut 32 for the purpose of preventing the nut from cutting into the gasket when the nut is rotating. The nut, of course, draws the flange 16 of the body 10 into engagement with the outer wall 18 of the jug and both gaskets 28 and 30 are compressed by the tightening of the nut in order to provide a water-tight joint between the spigot and the inner wall 20 of the jug.

The sleeve 12 is provided with a valve seat 36, against which a valve disc 38 of neoprene or rubber is normally seated by a head 40 of a valve stem 42. A retainer sleeve 44 is pressed on to a knurled portion 46 of the stem 42 for the purpose of retaining the valve disc 38 against the head 40. The sleeve 44 has a flange 48 against the disc 38 and the outer edge of this flange is of such diameter as to provide maximum bearing surface against the disc 38 and at the same time clear the bore of the valve seat 36.

The valve stem 42 is slidably mounted in a bearing portion 50 of the valve body 10 and terminates in an outer threaded end on which a thumb button 52 is screwed. A gasket washer 54 is retained against the bearing 50 by a spring 56 to prevent leakage at this point, and the spring also serves the purpose of normally holding the button 52 outward and the valve disc 38 thereby seated on the seat 36.

The thumb button 52 has a periphery which is other-than-round, it being shown hexagon shape on the drawing. A similarly shaped counterbore 58 is provided in the spigot body 10 so that the thumb button does not rotate relative to the spigot body.

The inner half of the valve stem 42 is surrounded by a bore 60 of somewhat larger diameter than the stem and this bore terminates in an outlet spout 62. The spout 62 projects but a short distance from the spigot body to eliminate the usual projection of the spout which is apt to catch on extraneous objects and either damage the spout or wrench the spigot loose from its assembled position in relation to the jug.

The spigot body 10 is also provided with a pair of lateral projections 64 which serve as stops for the first two fingers of the hand while the thumb presses inwardly on the button 52, thus increasing the possible leverage for opening the valve against the action of the spring 56.

My disclosed spigot is simple to operate and is self-closing so that it cannot be left accidentally open as in the case of a faucet-type spigot. The parts are readily and quickly assembled in relation to the jug wall and it is a simple matter to remove the valve, if necessary, by the use of a small screw-driver coacting with the slot in the head 40 of the valve stem. The push-button 52 is held against rotation due to its hexagon shape coacting with the hexagon bore 58 of the spigot body, so that the only tool required for this operation is the screw-driver itself. It is unnecessary to remove the entire spigot as in other types of valves when they require servicing.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:

1. In a push-button spigot, a spigot body of material having heat-insulating qualities to minimize the transmission of heat between the interior of a wall in which the spigot is mounted and the exterior of such wall, a metallic threaded insert molded in said spigot body and having an enlarged head therein, a nut thereon for mounting such spigot body in said wall, a valve element adapted for seating on a seat formed in said insert, a spring to normally effect such seating, a stem extending outwardly from said valve element, and a push-button mounted on said stem.

2. In a push-button spigot, a spigot body of heat insulating material, a headed insert imbedded therein and having a threaded part projecting from said body, a nut thereon for mounting said spigot body in a wall or the like, a valve element adapted for seating on a seat formed in said insert, a stem extending therefrom, a spring to normally effect seating of said valve element on said seat, a sealing washer surrounding said stem and engaged with said spigot body by said spring, and a push-button mounted on said stem, said push-button being entirely countersunk in said spigot body whereby it is protected from striking extraneous objects by the portion of said body surrounding it.

MILTON W. WEBER.

REFERENCES CITED

The following references are of record in the file of this patent:

UNITED STATES PATENTS

| Number | Name | Date |
| --- | --- | --- |
| 418,774 | Wagner | Jan. 7, 1890 |
| 628,258 | West | July 4, 1899 |
| 630,184 | Cooke | Aug. 1, 1899 |
| 862,009 | Newell | July 30, 1907 |
| 1,496,209 | Davis | June 3, 1924 |
| 1,629,496 | Fraser | May 24, 1927 |
| 1,632,418 | Ruegg | June 14, 1927 |
| 1,715,353 | Cordley | June 4, 1929 |
| 1,775,091 | Frank | Sept. 9, 1930 |
| 1,805,537 | Allan | May 19, 1931 |
| 1,982,071 | Roberts | Nov. 27, 1934 |